Oct. 11, 1938. D. LEONE 2,132,570
HAND SHIELD FOR WELDING APPARATUS
Filed Oct. 12, 1937
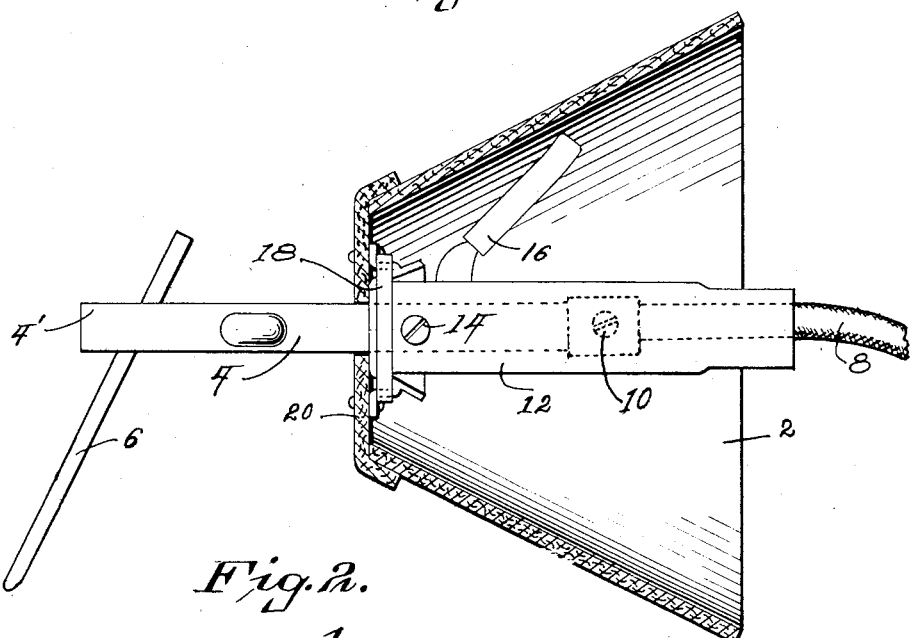
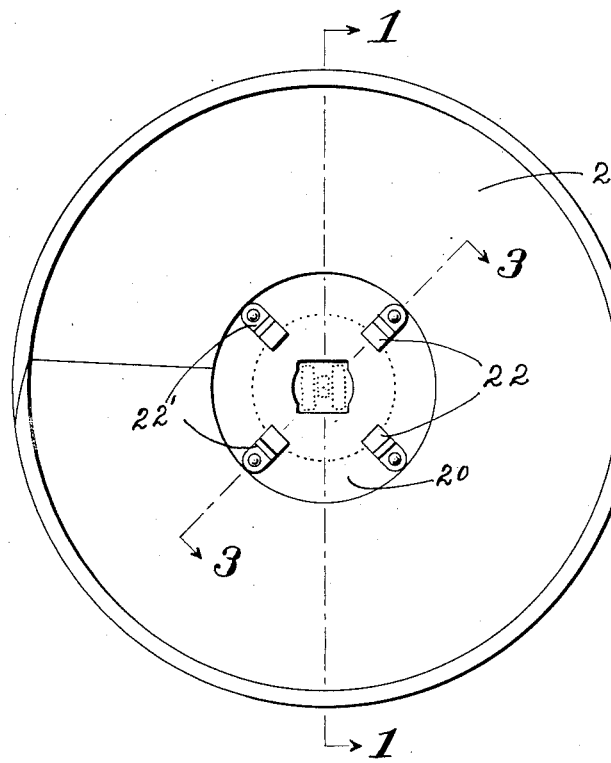
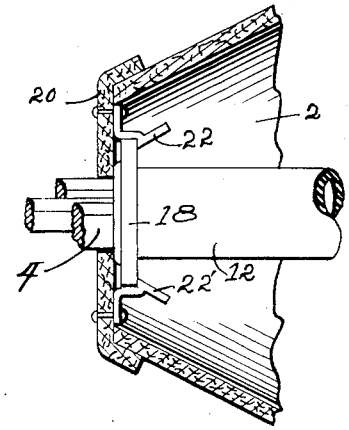
Inventor
Domenic Leone
By J. Wesley Everett
Attorney Patented Oct. 11, 1938

2,132,570

UNITED STATES PATENT OFFICE 2,132,570

HAND SHIELD FOR WELDING APPARATUS

Domenic Leone, Baltimore, Md.

Application October 12, 1937, Serial No. 168,659

1 Claim. (Cl. 2—17)

The present invention relates to a hand shield for welding apparatus and is particularly constructed for those which are electrically operated. There are several known types of these shields, but for numerous reasons they are impractical and are generally unpopular with the operators.

The high temperatures to which the hand of the operator is subjected makes it necessary to provide all the protection possible from the heat of the torch and the flying particles from the molten metal.

At present the operator usually wears a leather glove. These gloves have to be continually replaced after a few hours use due to the burning of the gloves by these flying hot particles, which land in the seams, or on the glove where it is not easily brushed or shaken off. This is particularly true if the welding is being done overhead or in a vertical position as the hot particles drop down between the glove and the handle of the apparatus, burning holes in the glove and rendering them unfit for use.

It is therefore one of the objects of this invention to construct a satisfactory shield to protect the operator's hand from these flying hot particles.

Another object of the invention is to construct a shield of a tough non-burning flexible material which can be easily flexed when necessary to manipulate the torch in close places.

Still another object of the invention is to construct a shield of an insulated material to protect the operator's hands from the intense heat and also prevent any occurrence of short circuits through the shield.

A further object of the invention is to construct such a shield that will be economical to manufacture and easily attached to the welding tool.

Still further objects of the invention will appear from the following specifications taken in connection with the drawing which forms a part of this application and in which:

Fig. 1 is a view partly in elevation and partly in section, showing a side elevation of the welding apparatus and a section of the shield taken along the line 1—1 of Fig. 2.

Fig. 2 is a rear view of the flexible shield member 2.

Fig. 3 is a fragmentary section of the shield 2 taken along the line 3—3 of Fig. 2 similar to that shown in Fig. 1 and showing also a fragmentary portion of the welding apparatus in elevation.

Referring particularly to the drawing, the shield member 2 is shown in use with an electric welding apparatus. Although the shield is particularly adapted to this type of tool, it is to be remembered that it is also applicable to gas, acetylene, and other types of welding apparatus.

The present electric welding apparatus is provided with means located on the front end thereof for holding a welding rod 6, which may be adjusted in any desirable position relative to the welding tool. The other end of the tool is provided with an electric cable 8, which is secured to the tool by a suitable screw 10. Surrounding the end of the tool to which the cable is attached is an insulated handle 12, which is secured to the tool by means of the screw 14. Operating within a slot in the handle 12 is a lever 16 for operating mechanism for holding the welding rod 6 in its adjusted position.

Adjacent the forward end of the handle member 12 is an insulated ring 18 used as a hand stop to prevent the hand of the operator from coming in contact with the portion of the tool carrying the electric current.

The shield specifically comprises a rigid, or semi-rigid member 20 secured to the apparatus adjacent the front end portion of the handle 12 or the ring 18, the tool portion 4 passing substantially through its center. The member 20 is also positioned in a plane running substantially perpendicular to the axis of the tool and lying between the welding rod 6 and the handle member 12. This member is constructed of a rigid or semi-rigid material of such consistency as to hold its shape and support the flexible portion 2 of the shield. The shield member 2 is made of a much lighter material and comparatively more flexible than the portion 20. The material used in the shield may be a heavy flexible rubber, raw hide, buckskin, canvas, or other suitable materials; while the material used for the member 20 is more rigid such as hard rubber, fibre, Bakelite, or it may be composed of some reenforced lighter material.

The member 20 is held in position upon the tool by a number of spring clips 22 and 22' which engage the ring 18 although any other well known fastening means may be employed.

In applying the shield to the tool, it is usually done before the rod 6 is placed in the clamping means of the member 4 and is placed over the front end portion of the member 4 back against the ring 18 until the spring clips 22 and 22' catch over the rearward edge thereof.

When the shield is in this position the handle portion 12, including the operating lever 16 are enclosed within the confines of the shield member 2, and therefore the operator's hand will be fully protected from the heat and flying particles of the molten material.

The flexibility of this shield provides a very satisfactory and practical device of this character. By means of this flexible shield the apparatus may be worked around close places or conveyed through small openings with ease and convenience without interference from the shield, and at the same time giving the operator complete protection for his hand.

While the invention has been illustrated and described in a particular form it is not intended that it be limited to this particular disclosure and description of use, as the scope of the invention is best defined in the following claim.

I claim:

A hand shield for hand welding apparatus comprising, a rigid circular supporting member having an opening substantially through the center thereof and means for securing said supporting member substantially perpendicular to the handle member of the apparatus within said opening, a conical collapsible shield member having its smaller end secured to the outer rim portion of the said support and having its outer end open, whereby said collapsible shield member is extended completely about the handle of said apparatus for protecting the hand of the operator.

DOMENIC LEONE.